United States Patent [19]

Taylor, Jr.

[11] Patent Number: 5,626,689
[45] Date of Patent: May 6, 1997

[54] METHOD OF GENERATING HEAT USING CATALYTIC MATERIAL

[76] Inventor: Jack H. Taylor, Jr., 6250 Valley Wood Dr., Reno, Nev. 89523

[21] Appl. No.: 536,198

[22] Filed: Sep. 29, 1995

Related U.S. Application Data

[60] Division of Ser. No. 384,133, Feb. 6, 1995, Pat. No. 5,505,745, which is a continuation-in-part of Ser. No. 197,979, Feb. 17, 1994, Pat. No. 5,387,565, which is a continuation-in-part of Ser. No. 783,877, Oct. 29, 1991, Pat. No. 5,288,674.

[51] Int. Cl.$^6$ .................. C21D 9/00; C21D 6/00; C21D 5/00
[52] U.S. Cl. .................. 148/606; 148/559; 148/679; 148/675; 148/669; 148/666; 148/703; 148/625; 148/708
[58] Field of Search .................. 420/8, 34, 441, 420/470, 417, 402, 528; 148/679, 675, 669, 666, 559, 723, 606, 625, 708

[56] References Cited

U.S. PATENT DOCUMENTS

| | | | |
|---|---|---|---|
| 2,488,530 | 11/1949 | Friedman et al. | 502/243 |
| 5,387,565 | 2/1995 | Taylor, Jr. | 502/63 |

FOREIGN PATENT DOCUMENTS

| | | | |
|---|---|---|---|
| 1128946 | 5/1989 | Japan | 502/243 |
| 4007034 | 1/1992 | Japan | 423/213.2 |

*Primary Examiner*—Deborah Yee
*Attorney, Agent, or Firm*—Sughrue, Mion, Zinn, Macpeak & Seas

[57] ABSTRACT

This invention relates to a catalytic fuel composition capable of reducing pollutants in the combustion gasses generated upon combustion of the same. A catalytic material is combined with a liquid, petroleum-based fuel, mixed and solid particles are separated out to give the catalytic fuel product. The catalytic material predominantly comprises a plagioclase feldspar belonging mainly to the albiteanorthite series, and contains small amount of mica, kaolinite and serpentine, and optionally contains magnetite. An alloy material is also disclosed, comprising a mixture of the above-described catalytic material and a metal. The alloy material exhibits unique properties relative to the metal component alone, such as increased tensile strength, improved heat resistance, improved acid resistance, improved corrosion resistance, as well as exhibiting unusual conductive properties. The catalytic material in either its native state, a state from which magnetite has been removed, or in an alloy form is also capable of generating heat upon being subjected to reduced (sub-atmospheric) pressure conditions in a controlled environment.

6 Claims, 2 Drawing Sheets

5,626,689

1

METHOD OF GENERATING HEAT USING CATALYTIC MATERIAL

CROSS-REFERENCE TO RELATED APPLICATIONS

This is a Divisional of my application Ser. No. 08/384,133 filed Feb. 6, 1995, now U.S. Pat. No. 5,505,745 which in turn is Continuation-in-Part application of my prior U.S. application Ser. No. 08/197,979 filed Feb. 17, 1994, now U.S. Pat. No. 5,387,565, which in turn is a Continuation-in-Part application of my prior U.S. application Ser. No. 07/783,877 filed Oct. 29, 1991, now U.S. Pat. No. 5,288,674, issued Feb. 22, 1994.

FIELD OF THE INVENTION

The invention relates to a catalytic device for treating combustion gas pollutants with use of a catalytic material derived from an unusual mineral formation of volcanic ash in either its native state, as preconditioned by magnetic separation, or as an alloy. More particularly, the invention relates to a catalytic material suitable for a variety of applications including, but not limited to, (1) treatment of exhaust gases generated by combustion of fossil fuels, both liquid and solid, and wood materials; and (2) treatment of gases generated from incineration of tire rubber and landfill waste; and also (3) scrubbing of steam well gases. The catalytic material of the present invention displays a remarkable ability to reduce the proportion of exhaust gas pollutants such as hydrocarbons, carbon dioxide, carbon monoxide, sulfur dioxide, nitrogen oxides while increasing oxygen output and strongly resisting deactivation by catalytic poisons.

The catalytic material described herein can also be added to a liquid hydrocarbonaceous or petroleum-based fuel to produce a novel fuel product having reduced noxious emissions with increased oxygen content upon combustion.

Further, the catalytic material can be formed into alloys with suitable metals. Such alloys have been discovered to possess diverse and important properties, in addition being catalysts—for example, such alloys have been determined to have unusually increased tensile strength, temperature resistance, acid resistance, and corrosion resistance relative to the metal alone. The alloy material can also be conductive or non-conductive, thus giving rise to a variety of applications. For example, the material can be used as a superconductor or a non-conductive substrate.

Moreover, the inventive material in its native state or in an alloy form is capable of generating heat under reduced (sub-atmospheric) pressure or vacuum conditions by a fusion reaction.

BACKGROUND OF THE INVENTION

It is well known that the combustion of fossil fuels, e.g., gasoline, generates deleterious automobile exhaust containing carbon monoxide, carbon dioxide, oxides of nitrogen (primarily $NO_x$), water, and nitrogen. The exhaust also can contain a wide variety of hydrocarbons and also particulates including carbon and oxidized carbon compounds, metal oxides, oil additives, fuel additives, and breakdown products of the exhaust system, including the exhaust-control catalysts.

These exhaust products can combine in a large variety of ways in the atmosphere, particularly since the amounts of each material change with operating conditions and the mechanical state of the vehicle. The photochemical reaction between oxides of nitrogen ($NO_x$) and hydrocarbons (HC) that caused the original interest in the automobile as a source of pollution has been investigated extensively.

Due to the now well-appreciated harmful effects of the vehicle emission pollutants to both health and to the environment in general, ever increasing stringent air quality standards are being imposed on emissions at both a federal and state level.

Also, many commercial operations, industrial processes or even home heating systems generate noxious gaseous chemical by-products, the removal of which must comply with federal or state regulations. These regulations may be highly expensive to meet with, if not cost prohibitive, using current exhaust gas treatment technology. Therefore, the anticipated benefits of improved environmental quality confers a very high value on any new engineering technology that might be useful to meet the regulatory air quality standards.

A known technology for control of exhaust gas pollutants from both stationary and mobile sources is their catalyzed conversion into more innocuous chemical species. Conventional oxidation catalysts used in this regard promote further burning of hydrocarbons and carbon monoxide in the exhaust gas. The normal operating temperature is 480° to 650° C. Oxidation catalysts in current use normally start oxidizing within two minutes after the start of a cold engine and will operate only when the catalytic species is sufficiently heated to achieve an activation temperature.

Known oxidation catalysts consist of platinum and mixtures of platinum and other noble metals, notably palladium. These metals are deposited on alumina of high surface area. The alumina ceramic material is typically capable of withstanding very high temperatures. The ceramic core has thousands of passages—about 240 per square inch. These passages present an enormous surface area for contact with the exhaust as it passes through the catalytic converter. The ceramic passages are coated with the platinum and palladium metals. These metals provide the catalysts.

When properly contained in the muffler-like shell of the catalytic converter, the catalysts will reduce hydrocarbon and carbon monoxide pollutants by changing them into more harmless products of water vapor and carbon dioxide. Another common form of oxidization catalyst involves a monolith in a honeycomb configuration to provide the necessary surface area and a top layer of the deposited catalytic metal species. The selection of one or the other above catalytic configurations is dictated by the kind of vehicle usage, as understood in the field.

However, conventional catalytic devices and catalytic species used therein have serious drawbacks in that they typically are susceptible to poisoning, i.e., deactivation resulting from chemical changes caused by the combined effects of thermal conditions and contamination as characterized by a chemical reaction of a contaminant with the supported catalysts. For instance, the most notorious poison for vehicular catalytic converters is the lead compound used as an anti-knocking agent. The poisoning of the catalysts by the contaminant, such as lead, is irreversible.

Moreover, many conventional catalysts also are susceptible to inhibition, or so-called reversible poisoning because of its temporary effect, due to exposure of the catalytic species to many common exhaust gas components such as carbon monoxide, nitrogen oxides or even some reduced sulfur compounds.

Compounding the poisoning problem encountered with many conventional catalysts used in treatment of exhaust gases is the demand for a more versatile catalytic species having applicability to diverse areas of exhaust gas treatment.

For instance, the federal and state regulatory attitude is ever increasingly stricter in imposing emission control standards covering a plethora of both commercial and private emission sources, e.g., coal burning plants and stoves, wood burning stoves, garbage incineration, used tire incineration, and not merely vehicle exhaust regulation.

Therefore, in an effort to meet current and perhaps even stricter future environmental air quality objectives, many public and private concerns have urgently awaited any possible innovations in the catalytic exhaust control field which might meet these standards.

SUMMARY OF THE INVENTION

One of the objects of the present invention is to provide an emission control device containing a catalytic material capable of reducing the level of harmful pollutants contained in exhaust gases generated by the combustion of fossil fuels, wood materials, rubber materials and the like.

It is another object of the present invention to provide a catalytic material which is not only capable of reducing the hydrocarbon, carbon monoxide and carbon dioxide emissions from burnt fossil fuels, but which also can reduce $NO_x$ emissions while concomitantly increasing the oxygen ($O_2$) content of the catalytically treated exhaust.

It is still another object of the present invention to provide an improved catalytic material which is highly resistant to poisoning from exhaust contaminants and has versatility in treating a wide diversity of combustion gas material generated from, for example, solid and liquid fossil fuels, other carbonaceous materials such as wood and garbage, as well as used tire rubber.

It is yet another object of the present invention to provide a catalytic material useful for scrubbing of steam well gases Towards achieving the above and other objects of the present invention, this invention provides for a novel catalytic material obtained from a volcanic ash material located in northern Nevada, Washoe County, near Pyramid Lake.

The inventive material comprises predominantly, i.e., greater than 50% by weight, plagioclase feldspar. Plagioclase is a general name for triclinic feldspars having anorthic or asymmetric crystal structure of three unequal long axes at oblique angles. Feldspar comprises the mineral $K_2O.Al_2O_3, 6SiO_2$.

Moreover, the predominant mineral component, plagioclase feldspar, belongs to the albite-anorthite o series; in other words, the feldspar material itself comprises albite and anorthite minerals. The albite ($NaAlSi_3O_8$) and anorthite ($CaAl_2Si_2O_8$) minerals are completely compatible and together form an isomorphous series ranging from the pure soda feldspar at the one end to the pure lime feldspar at the other end of the isomorphous series. There are isomorphous relations between these two molecules and substantial identity of crystal structure. For example, the sodium and calcium atoms, on one hand, and the silica and aluminum atoms, on the other, may replace each other in the structure.

Additionally, the inventive material contains minor amounts of other minerals, which, in sum, comprise less than 50% by weight of the total weight of the inventive material. Among the minerals which may constitute the "minor components" of the material and which have been identified as mica are—$KAl_2Si_3AlO_{10}(OH)_2$, kaolinite—$H_4Al_2Si_2O_9$ or $2H_2O.Al_2O_3.2Si_2$ and serpentine—$H_4MgSi_2O_9$ or $3MgO.2SiO_2.2H_2O$. These minerals are considered to constitute the bulk of the minor components, but the material obviously may contain a variety of other impurities, i.e., small amounts of other minerals and trace amounts of various metals and other elements. In its native state, the material also contains magnetite ($FeO.Fe_2O_3$).

While it has been discovered that the inventive material of the present invention can exhibit the catalytic effect in its native state, it has further been discovered that the catalytic effect can be enhanced when the inventive material is subjected to a magnetic separation treatment to remove magnetite ($Fe_3O_4$ or $FeO.Fe_2O_3$).

It is still another object of the present invention to provide for a novel fuel product in which the inventive material of the present invention, in either its native state or after having been subjected to a magnetic separation treatment to remove magnetite, is added to a liquid hydrocarbonaceous or petroleum-based fuel source (such as gasoline, kerosene, diesel fuel, or fuel oil for heating furnaces). The inventive material is mixed with and partially dissolved in the fuel source, then any remaining solid particles are removed by, e.g., filtration. The resulting composition comprises a novel fuel product which, upon combustion, produces emissions having less harmful hydrocarbons, carbon monoxide, carbon dioxide, $NO_x$, sulfur dioxide and similar pollutants, while having increased oxygen content. Thus, the novel fuel product can be used as a catalytic source of fuel.

The inventive material may also be combined with a metal to form a catalytic alloy material. The catalytic alloy material likewise exhibits unique catalytic properties, as described herein. Further, catalytic alloy material has been discovered to have other unique properties, in addition to catalytic properties. For example, the alloy material has increased tensile strength, temperature resistance, acid resistance, and corrosion resistance in comparison to the metal component of the alloy alone. Also, the alloy material can be produced in non-conductive or conductive form, as desired, thus leading to a variety of applications.

The inventive material can also be used in its native state, having magnetite removed, or in an alloy form to produce cold fusion and/or warm fusion. In other words, under reduced pressure or vacuum conditions in a controlled environment, the material has been observed to generate heat.

The novel features which are considered as characteristic for the invention are set forth in particular in the appended claims. The invention itself, however, both as to its construction and its method of operation, together with additional objects and advantages thereof, will be better understood from the following description as specific embodiments when read in connection with accompanying drawings.

Also, while the precepts of the present invention are presented in the context of an emission control device inserted into the output of an exhaust manifold of an internal combustion engine, it is to be understood that the inventive material and principles of its use described herein are adaptable to many other types of combustion gas treatment units.

DESCRIPTION OF THE PREFERRED EMBODIMENTS

Figure 1:
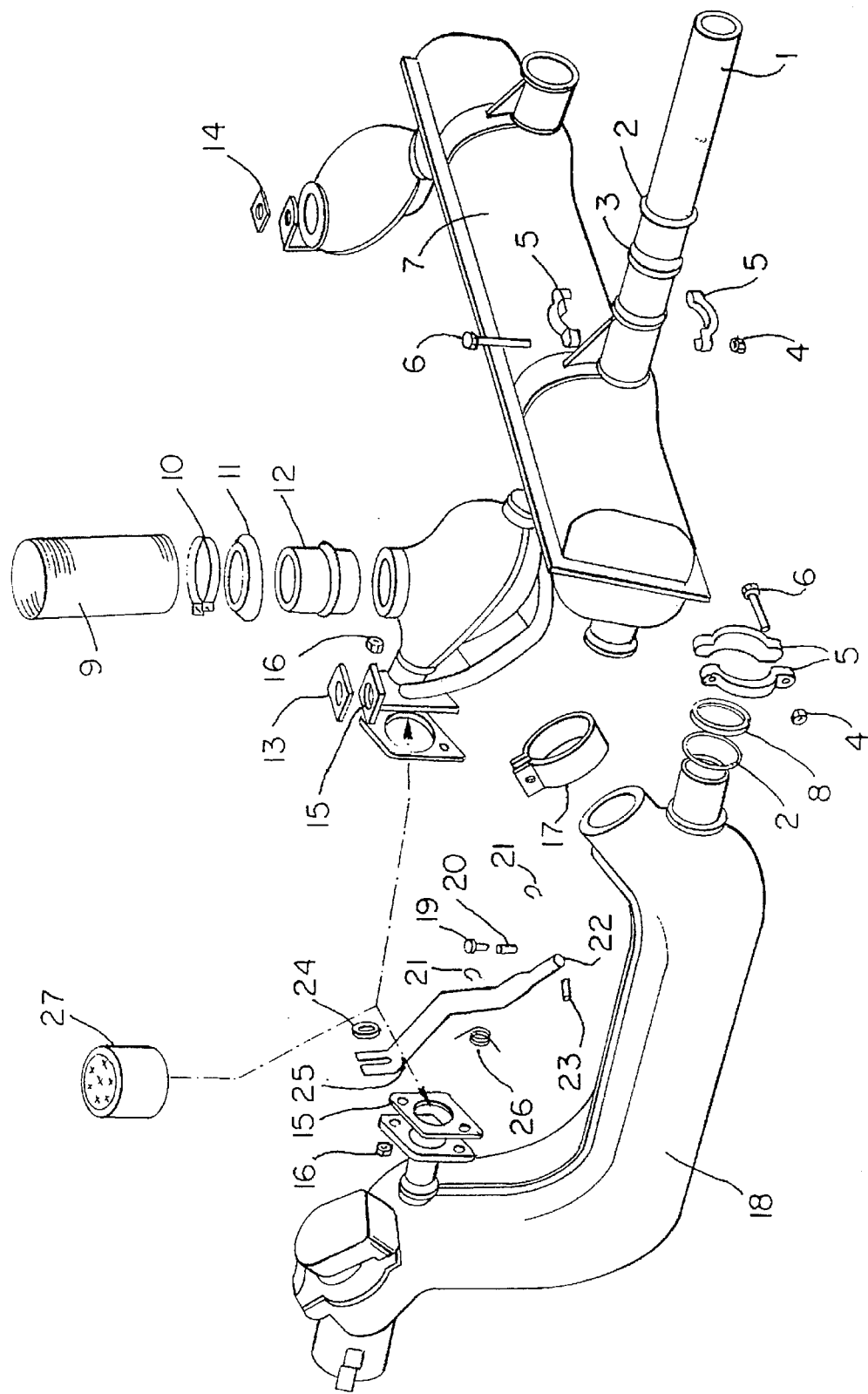
FIG. 1 represents a perspective view of an emission control device containing the catalytic material of the present invention when inserted into the output manifold of an internal combustion engine.

In the present invention, a catalytic material is used which is a volcanic ash obtained from an unusual mineral formation located in northern Nevada, Washoe county, near Pyramid Lake.

While the igneous raw mineral used in the present invention is available in different forms, two exemplary types of the material include the following: (1) a mineral substance which is light beige in color and resembles a sandstone type of material or texture, and (2) a mineral substance which is black in color and resembles a basalt type of material.

Based on expert interpretations of X-ray studies and other elemental analyses performed on the inventive material, both of the above-described strains of the inventive material are principally constituted by plagioclase feldspar and possess a complex morphology and esoteric composition.

The predominant (i.e., greater than 50 weight %) mineral component, plagioclase feldspar, is considered to belong to the albite-anorthite series. The albite ($NaAlSi_3O_8$) and anorthite ($CaAl_2Si_2O_8$) minerals are completely compatible in terms of their crystal structure, and together form an isomorphous series ranging from the pure soda feldspar at the one end to the pure lime feldspar at the other end of the series. There are isomorphous relations between these two molecules and substantial identity of crystal structure. The sodium and calcium atoms, on one hand, and the silica and aluminum atoms, on the other, may replace each other in the structure.

Also, as noted above, other minerals may be present in the material in amounts of up to (in sum total) 50% by weight, including, but not necessarily limited to, minor amounts of mica—$KAl_2Si_3AlO_{10}(OH)_2$, kaolinite—$H_4Al_2Si_2O_9$ or $2H_2O.Al_2O_3.2Si_2$ and serpentine—$H_4MgSi_2O_9$ or $3MgO.2SiO_2.2H_2O$. However, as noted above, a variety of impurities (other minerals, trace amounts of metals and other elements) are also present, including magnetite.

ICP (Inductively Coupled Plasma) and AA (Atomic Absorption) analyses were performed on the inventive material under the following protocol. The inventive material, as obtained from the source location described herein, was ground and homogenized by means of a disk disintegrator in order to obtain fraction of less than 100 mesh. Certain samples from the ground material were subjected to magnetic separation (i.e., removal of magnetite) and then treatment at temperatures of 500° C. (932° F.) or 750° C. (1382° F.) for two hours. The testing samples were numbered as follows:

1. Original inventive material (clumps removed by mechanical grinding).
2. Inventive material after magnetic separation.
3. Magnetic fraction isolated from the original inventive material.
4. Inventive material after magnetic separation and after treatment at 500° C.
5. Inventive material after magnetic separation and treatment at 750° C.

Samples 1, 2, and 3 were then digested in acids using the following procedure:

1 gram of a sample was placed in teflon beaker and added 15 ml nitric acid ($HNO_3$), 10 ml percloric acid ($HClO$) and 2 ml hydrofluoric acid (HF). That beaker was covered with teflon lid and placed on a 250° F. hotplate for 1½ hours. Then the cover was removed and mixtures were evaporated at 300° F. for 4 hours. The residue in the beaker was cooled and added 5 ml $HNO_3$ and 20 ml distilled water. The mixture was boiled for 5 minutes and diluted to 50 ml in volumetric flask with distilled water. That solution was analyzed for metal (but not Si/silica content—see below) content by means of Inductively Coupled Plasma (ICP) using Perkin-Elmer Plasma II Emiston Spectrometer and by means of Atomic Absorption Spectrometer using Perkin-Elmer AAS-3100. The results from these analyses are shown in Table 1.

TABLE 1

"ICP" AND "AA" ANALYSIS OF MATERIAL IN PPM

| Sample Number | Zn | Cd | Pb | Cu | Co | Ni | Fe | Mn | Y | Mg | Ca |
|---|---|---|---|---|---|---|---|---|---|---|---|
| 1 | 50 | 10 | 30 | 10 | 0 | 0 | 21500 | 475 | 10 | 3715 | 14740 |
| 2 | 45 | 0 | 35 | 10 | 0 | 0 | 11000 | 340 | 10 | 3440 | 15585 |
| 3 | 840 | 40 | 80 | 40 | 45 | 0 | 507000 | 3875 | 20 | 375 | 11235 |

| | Mo | W | B | Ba | P | Nb | Ti | As | Cr | Sb | Ta |
|---|---|---|---|---|---|---|---|---|---|---|---|
| 1 | 0 | 10 | 40 | 1100 | 385 | 15 | 1325 | 10 | 0 | 10 | 15 |
| 2 | 0 | 0 | 35 | 1110 | 300 | 15 | 1325 | 10 | 0 | 0 | 20 |
| 3 | 0 | 20 | 35 | 210 | 3115 | 175 | 1300 | 40 | 30 | 50 | 105 |

| | Bi | Be | V | Zr | | | Na | K | | | Al |
|---|---|---|---|---|---|---|---|---|---|---|---|
| 1 | 0 | 0 | 30 | 75 | | | 30300 | 26500 | | | 111740 |
| 2 | 0 | 0 | 10 | 75 | | | 30200 | 26100 | | | 105220 |
| 3 | 10 | 10 | 845 | 40 | | | 4010 | 2800 | | | 10460 |

To determine the $SiO_2$ content from samples 1, 2 and 3, the samples were also subjected to high pressure digestion in hydrofluoric acid in order to dissolve the materials. The samples were then analyzed as above, and $SiO_2$ content was found to be 66.3 wt % for sample 1, 67.1 wt % for sample 2, and 11.7 wt % for the magnetic fraction, sample 3. Overall, these elemental analyses of samples 1 and 2 confirm the mineral content of the material discussed above.

Also, after temperature treatment at 500° C. or 750° C. (samples 4 and 5), the inventive material was subjected to X-ray diffraction analysis. The results revealed a material comprising mainly plagioclase feldspar and traces of mica. Kaolinite and serpentine were also believed to be present but did not appear on the charts since these compounds release their crystallization water when heated.

Also, ICP and DC plasma analyses on a sample of the inventive material further detected the presence of the following elements, beyond those already noted in Table 1 above, in trace amounts in the material (on the order of 0.5 ppm to 0.02% by weight for each element): Silver, molybdenum, nickel, tin, lithium, gallium, lanthanum, tantalum, strontium, zirconium, and sulfur. In addition, the presence of the following oxides was confirmed: silica ($SiO_2$), titanium dioxide ($TiO_2$), alumina ($Al_2O_3$), iron oxide as $Fe_2O_3$ (magnetite), manganese oxide (MnO), magnesium oxide (MgO), calcium oxide (CaO), sodium oxide ($Na_2O$), potassium oxide ($K_2O$), and phosphorous oxide ($P_2O_5$).

Another aspect of the present invention is the discovery that the inventive material can be used as a catalyst in at least two different states. For instance, the inventive material can be used in its native state or, alternatively, the inventive material can be combined with a suitable metal and subjected to conventional foundry furnace processing at appropriate temperatures, e.g., approximately 2000°–4000° F., to form a solid metal alloy variation of the inventive material. This material is referred to herein as the "catalytic alloy material."

In either practical variation, the inventive material can be subjected to magnetic separation treatment to remove magnetite, in the main, before use of the material as a catalyst in its native state or after the foundry treatment to form an alloy. The magnetic separation treatment can be performed with a conventional ferromagnetic device or a conventional electromagnetic device.

The invention is first illustrated in greater detail herein with exemplary usage of the inventive material in its native state (preferably after agglomerated clumps are mechanically eliminated), followed by a more detailed discussion of the catalytic alloy material.

As another important aspect of the present invention, it has been determined that the inventive material of the present invention exhibits its unexpected catalytic effect after being activated by heating to and maintaining a temperature of approximately 850° F. or higher. However, this activation can be accomplished in-situ (in the automobile exhaust system) if the activating temperature of approximately 850° F. or higher is experienced by the emission control device as installed in the hot exhaust system.

On the other hand, if the exhaust system does not operate continually at the activating temperature, then external heating sources, described in greater detail hereinafter, may be used to provide the supplemental heating needed for activating the inventive material in the installed emission control device.

Unlike conventional honeycomb systems with platinum or palladium, the mineral substance of the present invention will not clog up a honeycomb surface so as to necessitate replacements of the converter after a given period of usage.

Also, and significantly, the inventive material or alloy substance of the present invention does not become deactivated or poisoned due to exposure to exhaust contaminates such as lead. Therefore, the inventive material of the present invention is particularly useful for catalytic treatment of combusted leaded gasoline.

Moreover, the nature of the inventive compound or alloy compound of the present invention allows for applications to be cast, shaped, and/or fabricated into any desired configuration commensurate with the specific usage, such as car exhaust manifolds, and coal burning smokestacks and stoves requiring customized designs of the emission control device.

Additionally, it has been determined that the catalytic effect of the inventive material of the present invention is demonstrated in its native state, but this catalytic effect also can be significantly enhanced after subjecting the original inventive material to a magnetic separation treatment. During the magnetic separation, the black fraction of the material is taken out which mainly comprises magnetite ($Fe_3O_4$ or $FeO.Fe_2O_3$). The magnetic fraction may also contain hydroxylapatite—$Ca_5(PO_4)_3OH$.

When heated to 220° C. in oxygen, the inventive material remaining after magnetical separation changes in color to red $Fe_2O_3$ without, however, any noticeable change in magnetism or the X-ray structure pattern, but when heated further to 550° C. all magnetism disappears. This loss of magnetism is believed to be associated with the color change observed in the material during heating at the higher operating temperatures of 850° F. or higher.

While the inventive material of the present invention has many and diverse possible applications, as suggested above, the use of the inventive material in an emission control device inserted in an exhaust manifold output of an internal combustion engine is described in detail below for illustration purposes.

It has been discovered that an emission control device containing the inventive material of the present invention, when inserted into the exhaust system of a gasoline engine, will reduce the harmful emissions of hydrocarbons, carbon monoxide and carbon dioxide by as much as 72% of the original content. Moreover, a reduction in the $NO_x$ emissions is observed concomitant with an increase in the emission of oxygen ($O_2$).

An illustrative depiction of the emission control device, as to be installed, is provided in FIG. 1. The elements depicted in FIG. 1 are described below by reference to their assigned reference numerals.

1 tail pipe
2 Retaining ring
3 Seal
4 Self-locking nut
5 Clamp
6 Clamp belt
7 Silencer
8 Seal
9 Air inlet hose
10 Hose clip
11 Grommet
12 Connecting pipe
13 Gasket-pre-heater pipe (left)
14 Gasket-pre-heater pipe (right)
15 Gasket-exhaust pipe flange
16 Self-locking nut
17 Clamp
18 Heat exchanger
19 Bolt
20 Pin
21 Circlip
22 Heater cable link
23 Pin
24 Clamp washer
25 Heater flap lever (left)
26 Lever return spring (left)
27 Emission Control Device (E.C.D.)

The E.C.D. insert device 27 can be installed without the need for modification of the existing engine exhaust system. However, atmospheric air must be prevented from entering the manifold before the emission control device (E.C.D.). All connections must be sealed.

In order to achieve satisfactory operating efficiency of the E.C.D., the optimum exhaust gas temperature is 850° F. or above. The temperature is measured at the base of the E.C.D. In cold engine starting, and in some engines when idling, the exhaust gas temperature is below 850° F., so when this occurs, an external thermostat-controlled preheater device (not depicted) is attached to the E.C.D. For instance, a heating wire (not depicted) is connected between the E.C.D. and a remote thermostat. The heating wire is preferably coated with inventive material using the same type of paste employed in the E.C.D. and described hereinafter.

When using the preheater device, the E.C.D. begins to function within one minute of a cold engine start. When the engine exhaust gas temperature rises to 850° F. the thermostat automatically turns off the preheater and remains off unless the temperature falls below 850° F. The preheater can be powered by the existing vehicle battery and produces an amperage load approximately equal to a factory installed cigarette lighter. Activation of the preheater can be accomplished through the accessory section of the ignition switch, so there is no battery current drain until the engine is started.

In the event E.P.A. regulations change to include cold engine starting, the E.C.D. can simply be controlled in a similar manner as adapted from known diesel engine preheaters for cold starting in current use.

As depicted in FIG. 1, the E.C.D. 27 is tubular in construction or, alternatively, of strip construction, and is mounted in a standard exhaust manifold to tail pipe flange. The tube section O.D. is determined by the I.D. of the exhaust manifold opening. Since the manifold port inside diameter is greater than the exhaust tail pipe I.D., the device may be inserted into the manifold without creating exhaust back pressure.

The tube portion of the E.C.D. may be steel or steel alloy or a ceramic. The tube is attached to a standard exhaust pipe flange that bolts directly to the manifold. When the device is installed, the tube portion inserts into the manifold and the flange is sandwiched between the manifold and the exhaust tail pipe flange. The preheater electrical conductor protrudes through, but is insulated from the flange, and connects directly to the thermostat.

Since the tube acts only as a carrier for the reactive coating, the composition of the tube carrier need only be selected with the constraint that it is able to withstand the high temperature of the exhaust gas and the operating temperature of the E.C.D. In this regard, high temperature ceramic tubes are useful.

The active ingredient of the E.C.D. is a coating containing the inventive material as applied to the tube surface portions, both inside and outside, and also onto the preheater wire, if needed.

In order to provide this coating, the inventive material described above is first dry pulverized to powder size of no less than 40 mesh but sufficient to eliminate clumps. Then the inventive mineral material is applied to the surface of the E.C.D. tube in a dispersed state in a high temperature ceramic paste, then cured in an oven at elevated temperature. A representative ceramic paste is Zirconia Ultra Hi-Temp Ceramic supplied by CoTronics Corp. This paste can withstand heat of up to 4000° F.

Installation of the Emission Control Device can be accomplished by the procedure of placing the vehicle on a hoist, removing the manifold-to-tail pipe bolts, lowering of the pipe approximately three inches. Then, the tube portion of the E.C.D. is inserted into the exhaust manifold, then the flange is aligned with the manifold bolt, and then the tail pipe is replaced and the manifold bolt tightened.

On 2–4 and 6-cylinder engines having one exhaust manifold, one E.C.D. typically is used. On a V6 and V8 engines, the E.C.D. is inserted in each manifold.

The basic shape of the device can be maintained for all engines, but the size is determined by the cubic inch displacement of the engine. Approximately five flanges and tube sizes will fit U.S. vehicles and some foreign vehicles. The emission control device of the present invention can be used alone as a catalytic converter for the exhaust system of a gasoline engine or, more desirably, can be used to augment existing exhaust systems.

When installed in older vehicles and any four cycle gasoline engines, the emission control device of the present invention acts as a catalytic converter transforming the engine into a clean emission engine which meets current state emission standards. Also, while automotive manufacturers have different exhaust configurations, the emission control device of the present invention can be adapted to physically fit the different engine exhaust pipes in ready fashion. Nonetheless, the operating efficiency of the emission control device of the present invention remains the same.

Figure 2:
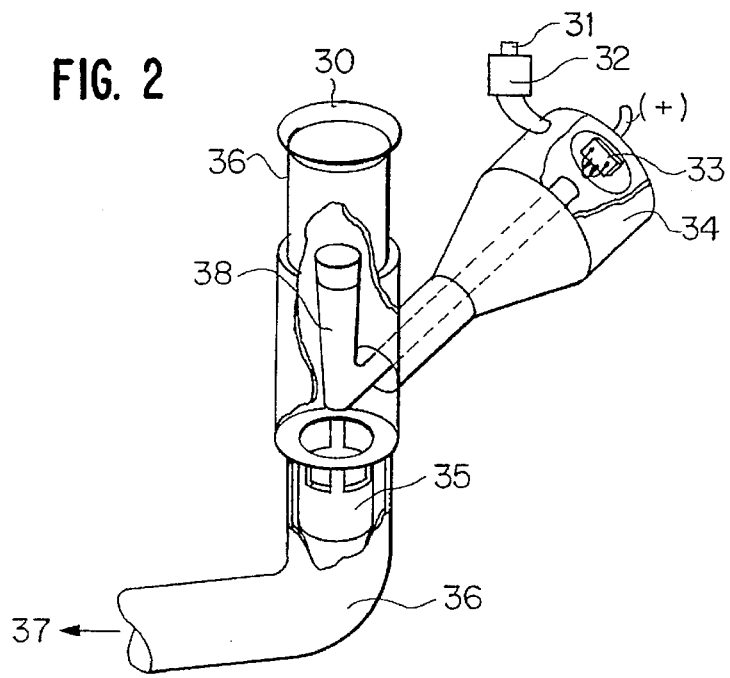
FIG. 2 depicts a perspective view of an emission control device containing the catalytic material of the present invention when inserted into the exhaust pipe of a two-cycle engine pulse air system.

FIG. 2 shows another preferred embodiment for the E.C.D. FIG. 2 generally depicts a two-cycle engine pulse air system. Numeral 30 illustrates the connection to the cylinder head exhaust. E.C.D. 35 is retrofitted into the existing exhaust pipe 36. The cut-away part of the exhaust pipe 37 connects to the muffler. As shown, a tubular type E.C.D., similar to that described in FIG. 1 above, is inserted in the exhaust pipe 36 below air tube 38 connecting to chamber 34. The basic construction and operation of a two-cycle engine pulse air system would be well understood by one of ordinary skill in the art, FIG. 2 being illustrative and showing other conventional components such as igniter 6 volt @ 3 amp 33, pulse air intake 31, and pulse air valve 32. The tube portion of E.C.D. 35 may be steel, steel alloy, or ceramic, similar in construction and operation to that described above with reference to FIG. 1. Again, the tube portion acts only as a carrier for the reactive coating which contains the inventive material, preferably applied to the tube surface portions both inside and outside as a ceramic paste. Alternatively, the reactive coating may be the catalytic alloy material which is described in more detail hereafter. The alloy version can be applied, for example, by dipping the carrier in molten alloy and allowing the alloy to solidify on the desired surfaces.

Figure 3:
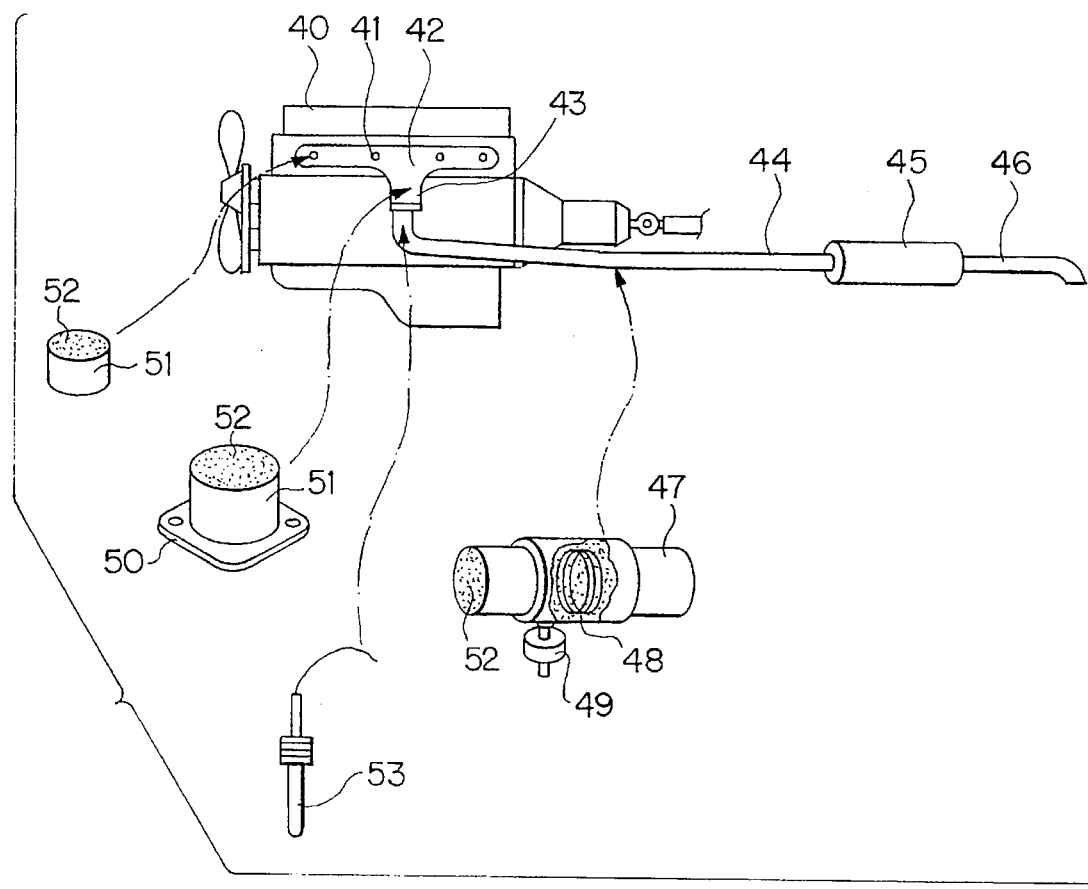
FIG. 3 shows a perspective view of an internal combustion engine, such as a 4-, 6- or 8-cylinder engine, showing various usages of the catalytic material of the present invention.

FIG. 3 represents a perspective view of an internal combustion engine 40, which would be understood to include 4-, 6-, and 8-cylinder engines in widespread usage today. The construction and operation of such internal combustion engines, designed primarily for automotive vehicles, are well known and understood by one of ordinary skill in the art. In FIG. 3, combustion exhaust gases exit the engine through exhaust ports 41, then through exhaust manifold 42, exhaust manifold outlet 43, through exhaust pipe 44, exhaust muffler 45, and exit through tailpipe 46 in a known manner. In accordance with a preferred embodiment of the present invention, the inventive material, in either its raw material form or the catalytic alloy material form described in more detail hereafter, can be used to reduce noxious emissions in a number of locations. For example, an E.C.D. 51 showing the reactive coating 52 can be inserted into the manifold at the cylinder head exhaust ports. The E.C.D. is similar in construction and operation to that described above with respect to FIGS. 1 and 2. Also, an E.C.D. 51 can be adapted to be inserted into the exhaust manifold through flange portion 50, i.e., sandwiched between the manifold 42 and the exhaust pipe flange 50 at the exhaust manifold outlet 43. Still further, an E.C.D. can take the form of that depicted as 52, which is an expanded tube designed to be installed inline in the exhaust pipe 44. A section of the exhaust pipe is cut out and the E.C.D. installed by use of standard exhaust pipe clamps or by welding. If desired, this E.C.D. 52 may be adapted to contain a preheater 48 and thermostat 49, the thermostat being controlled by the accessory side of the ignition switch. The raw inventive material, or the catalytic alloy variation described in further detail below, is coated (see 52) on the interior diameter of the tube section and may also be coated on the preheater coil. An alloy E.C.D. 53 in the shape of a bolt can be inserted directly into the exhaust pipe 44 at any location, but preferably between the exhaust manifold outlet 43 and muffler 45 as shown in FIG. 3.

As can be appreciated from the descriptions provided herein, the catalytic device and inventive material of the present invention provide an improved catalytic material which is highly resistant to poisoning from exhaust contaminants and has versatility in treating a wide diversity of combustion gas material generated from, for example, solid (e.g. coal) and liquid fossil fuels, other carbonaceous materials such as wood and garbage, as well as used tire rubber.

The inventive material in either its native state or a state having had magnetite removed can also be used to create a novel catalytic fuel product as described below. By adding the inventive material to a liquid hydrocarbonaceous or petroleum-based fuel source, such as gasoline, kerosene, diesel fuel, fuel oil for heating furnaces, or petroleum-based toxic waste liquids, allowing the resulting mixture to stand for a certain period of time while undergoing gentle agitation or mixing, and then subjecting the mixture to ultrafiltration or other separation technique to remove solid particulates, the resulting fuel product has improved catalytic properties. That is, upon combustion of the fuel product, the exhaust gasses contain less pollutants, such as hydrocarbons, carbon dioxide, carbon monoxide, sulfur dioxide, and nitrogen oxides, and an increased oxygen output in comparison to an untreated fuel source.

A typical catalytic fuel product in accordance with the present invention can be made as follows. About 4.5 pounds of the inventive material in its native state were crushed with a stone crusher to grind the ore into fine particles. An impact mill can also be used for this procedure, if desired, or any other apparatus capable of producing fine particulates of the inventive material can be used. The resulting fines were added to ten gallons of petroleum fuel, and the resulting mixture was allowed to sit for approximately four days while gently agitating the mixture. At least some of the inventive material dissolves in the fuel during this time. After the mixing period, the mixture is subjected to ultrafiltration using fine filter paper having a pore size of about one micron, to remove any solid particles in the mixture. Filtration is only one example of a separation technique which could be used; it would be understood that other techniques, such as centrifugation as one example, could be used, if desired. The goal is to remove all solid particles from the fuel mixture, if possible. The resulting filtered fuel product exhibits improved catalytic properties. That is, upon combustion, exhaust gasses have been demonstrated to contain less contaminants (e.g., hydrocarbons, carbon monoxide, and carbon dioxide emissions, as well as reduced $NO_x$ emissions), whereas the oxygen content of the exhaust is concomitantly increased.

Good results have been demonstrated for catalytic fuel products made as above using the inventive material (in its native state, or a state having had magnetite removed as discussed above) in a general weight per volume ratio of about 0.5 to about 7.5 pounds per 10 gallons of liquid fuel to be treated. A more preferred range is from about 3 to about 6 pounds of inventive material per 10 gallons of fuel, and the most optimum results have been demonstrated using about 4.5 to 5 pounds of inventive material per 10 gallons of fuel source. Further, while the best results have been demonstrated when the mixture of inventive material and fuel source has been allowed to undergo mixing or agitation on the order of three to four days, it would be understood by one of ordinary skill in the art that shorter or longer times can be used for this step of the process, as desired.

Petroleum-based toxic liquid wastes can be treated in the same manner as hydrocarbonaceous fuel sources by adding the inventive material (in either its native state or in a state from which magnetite has been removed) to the toxic liquid waste in the same manner as described above. Upon combustion, noxious emissions, including sulfuric acid and other sulfur-based emissions in particular, have been observed to be unexpectedly decreased.

The inventive material in this particular application as a fuel additive can be mixed with the hydrocarbonaceous or petroleum-based liquid fuel during a wide variety of stages of fuel production, or can be added to an end product ready for consumption (e.g., gasoline). For example, the inventive material can be added during various stages at an oil refinery in the production of leaded or unleaded gasoline from crude oil, including the refining process. Further, a fuel additive mixture can be made for direct addition to the fuel tanks of vehicles where the catalytic fuel product becomes mixed with gasoline contained in the tank.

As noted above, the applicant has. further discovered that the inventive material can be used as a catalyst in at least two different states. For instance, the inventive material can be used in its native state or, alternatively, the inventive material can be combined with a suitable metal and subjected to foundry furnace processing to form a solid metal alloy variation of the inventive material.

Like the raw mineral variation, the alloy variation of the inventive material reacts on the exhaust gases in a similar manner as does other proven catalytic converters with the following advantages.

The catalytic alloy material requires no additional chemical compositions, such as platinum sprays, impregnated materials applied to acrylics, or aluminum bodies, to create the catalysis reactions. With the density and the solid mass techniques, the catalytic alloy material, unlike the honeycomb systems used, will not clog up the honeycomb surface resulting in a need to replace the converter after a given period of usage. The resulting catalytic alloy material is cheaper to manufacture and install, offering a consumer a viable alternative at less cost.

In view of the non-clogging and reaction mass offered in the catalytic alloy material, it successfully reacts in treatment of exhaust/combustion gases associated with coal burning, autos, garbage incineration, industrial coal applications, tire incineration, and waste product removal. The inventive material can also be used to purify water by removing contaminants therefrom, by simply passing the water to be purified through an appropriately designed sample of the material. The catalytic alloy material can be developed with pre-heating capabilities either by induction or resistant methods to facilitate its use at low temperatures. The catalytic alloy material can also be added to some types of fuels for use in exhaust systems.

To form the desired catalytic alloy material, the inventive material, in its native state or having had magnetite removed, is mixed with a suitable metal. The raw inventive mineral material is first crushed, for example, with a standard ore crusher. The selected metal is then heated to a desired melting temperature, usually within the range of 2000°–4000° F. for most metals; typically, the metal is melted in a furnace crucible. The crushed raw material may then be added to the molten metal. While this sequence is preferred, it will be understood that the metal and crushed raw material can be mixed together, then heated, if desired. Examples of suitable metals include copper, iron, steel, stainless steel, brass, titanium, cast iron, aluminum, magnesium, etc. Of course, alloys of these and other metals can be chosen, if desired, depending on the ultimate end use of the catalytic alloy material. In general, the amounts of mineral component and metal, respectively, are not critical. Amounts of raw material as low as about 1% by weight may be suitable for some applications. Preferred relative proportions are preferably from about 10 to about 75 wt % inventive material and from about 90 to about 25 wt % metal. The applicant has found that the optimal effects of the invention will be achieved with varying amounts of raw material/metal. Samples have been made using a ratio of about 30 wt % copper/70 wt % raw material, 50 wt % titanium/50 wt % raw material, 50 wt % aluminum/50 wt % raw material, 75 wt % stainless steel/25% wt % raw material, and 30 wt % brass/70 wt % raw material. For automobile applications, these alloys have been found to exhibit excellent catalytic effects as to reducing pollutants in the exhaust gases while increasing the $O_2$ content of the catalytically treated exhaust in the manner described above.

The inventive material and the metal are combined together, as described above, to form a mixture. The mixture is then subjected to conventional foundry furnace processing to form a solid metal alloy compound. Typically, furnace temperatures are preferably from about 2000° to 4000° F., depending on the metal used. For example, a temperature range of 2200–2400 works well for copper. On the other hand, stainless steel is known to melt at higher temperatures. The appropriate melting temperatures and times would be readily apparent to one of ordinary skill in the art. An average processing time in the furnace is about ½ to 4 hours, after which the alloy material can be cast or molded into desired configurations or solidified and re-melted later.

A solidified catalytic alloy material can be re-melted by appropriately heating it. Ceramic, metal, or wire configurations, which are pre-shaped or designed, can be dipped into or plated with the re-melted catalytic alloy material. Solid alloy devices can be cast, shaped, or fabricated to any desired configuration, for catalyst uses such as combustible applications, fire boxes, or stacks.

The catalytic alloy material can be used in some exhaust applications when the ceramic paste material version (discussed above with respect to the E.C.D. in FIG. 1) may be unsuitable. The catalytic alloy material can be ground to a very fine mesh and then can be flame coated (using a commercial unit) on the substrate. The alloy material is applied with a torch-like device which sprays onto preformed units or devices.

In furnace and stove catalytic applications, the catalytic alloy material should be located just beyond the flames and maintained at 850° F. or higher for best results. The alloy can also be heated and used to remove harmful gases (such as $H_2S$) in water in steam-well generating plants. The catalytic alloy material can also be used to clean up toxic material.

Besides having catalytic properties, alloy materials of the type described above have been discovered to possess other important and unexpectedly improved properties relative to any of the metals alone (e.g., copper, steel, stainless steel, brass, titanium, aluminum, nickel, magnesium, or other desired metals). In particular, such alloy materials have been discovered to possess unusually increased tensile strength when the inventive material in its native state, or having had magnetite removed, is combined with the metal in a relatively low concentration. A preferred amount of the inventive material is from about 0.5 to about 25% by weight and a particularly preferred amount of the inventive material is from about 1% to about 5% by weight based on the weight of the metal used to form the alloy. Such alloys can be produced in the same manner as described above for the catalytic alloy material. As one example, when about 3 parts by weight of the inventive material in its native state are combined with about 100 parts by weight of aluminum to form an alloy, the tensile strength was increased approximately ten-fold relative to aluminum alone. That is, aluminum is known to have a tensile strength in the range of 18,000 to 22,000 psi, whereas the tensile strength of the resulting alloy material was measured to be approximately 119,000 psi.

The same type of alloy materials have also been discovered to have unusually high heat-resistance. That is, alloys made using relatively low weight percentages of the inventive material (in its native state or having had magnetite removed) produce super heat-resistant alloys when combined with suitable metals as exemplified above. These super heat-resistant metal alloys can be made to withstand temperatures of 30,000° F. or higher, depending upon the metal chosen and desired level of temperature resistance. For example, in the same sample made using aluminum as the metal as mentioned immediately above, an approximate ten-fold increase in the temperature resistance was demonstrated. That is, aluminum is known to have a melting point of about 1,220° F. and a vapor point of about 4,472° F. However, the aluminum/inventive material alloy formed in the proportions of 100/3 parts by weight had a melting point of approximately 12,000° F. Depending on the proportions of metal and inventive material used, increase in temperature resistance for the alloy has been demonstrated to range from about 5 to 12 times the temperature resistance of the metal alone. A tenfold increase in temperature resistance is typical. For example, in another example using steel as the metal (steel is known to have a melting point of about 2,100° F.), an alloy was formed using the inventive material of the present invention in its native state in an amount of about 3 parts by weight per 100 parts of steel. The resulting alloy had a melting point of about 21,000° F. Similar results were observed using stainless steel (2,500° F. melting point) when converted into an alloy material with the inventive material (melting point of alloy was about 25,000° F.). Further, in an example using 100 parts titanium as the metal and 3 weight parts of the inventive material in its native state, the resulting melting point of the alloy was measured in an electron beam furnace as close to 30,000° F., whereas titanium is known to have a melting point of approximately 3,047° F. and a normal vapor point of 5,900° F.

The above-described alloy materials having increased tensile strength and temperature-resistance have also been demonstrated to be more highly resistant to acids and corrosion than the metals alone.

The inventive material in its native state or a state from which magnetite has been removed, or in an alloy form with a suitable metal, has been determined to display important conductivity properties. In other words, depending on the type of metal selected and the quantities of the inventive material used, a material is obtained which can be either conductive or non-conductive. That is, metals are typically conductors, but when combined with the inventive material to form an alloy, the metal can be converted into a non-conductive material under appropriate conditions. Since the inventive material is non-conductive in its native state, relatively high proportions of the inventive material vis-à-vis the metal component can produce exceptionally versatile alloys with little or no conductivity. Such non-conductive or low-conductive materials have wide-ranging applications, for example, as computer boards, substrates, integrated circuit materials, etc. On the other hand, using the inventive material in relatively low quantities with respect to the metal component to produce the types of heat-resistant, increased tensile strength alloys mentioned above can in certain cases increase the conductivity of the metal to form super-conductive materials.

The inventive material in its native state, in a state from which magnetite has been removed or in a suitable alloy form, is capable of generating heat under reduced pressure conditions in a controlled environment. For example, in any of those forms, if a sample of the material is placed in a vacuum furnace chamber subjected to reduced, sub-atmospheric pressure or vacuum conditions by removing the ambient air, the material generates heat under such reduced pressure conditions. When the sample is returned to atmospheric pressure and ambient conditions, the heat generation dissipates. The generation of heat is believed to be due to a cold fusion and/or warm fusion reaction involving the inventive material due to such reduced pressure or vacuum conditions. The heat-generating ability of the inventive material under these conditions can be observed by placing a sample of the material in a glass jar with an attached vacuum pump, removing the ambient air to create a vacuum environment inside the glass jar, and after a short while, the exterior surface of the glass jar becomes hot. For example, a Sprengel mercury vacuum pump can create a reduced pressure inside the controlled environment on the order of 0.001 mmHg. Thus, the inventive material described herein is essentially capable of generating heat under reduced pressure conditions, which property can be used in a wide variety of practical applications.

The inventive material in its native or alloy states can also be used in insulation applications, extinguishing of fires, or in the cleanup and removal of oil and fuel spills on land or water. When sprinkled over fire, the inventive material (crushed) has been shown to smother flames and contain smoke.

Both the alloy and the native material can be used as a catalyst in a self-contained burner, furnace, or incinerator whether in private or commercial applications. The exhaust stack is piped back into the air feed or fire box areas, or the exhaust of combination engines is piped back into intake areas or carburetor areas. In this case, a closed system is obtained with no exhaust emissions. Fuels such as all fossil fuels, garbage, wood, plastics, tires, coal, hospital wastes, certain toxic wastes, or any material organic or inorganic which is combustible can have a self-contained system with no emissions. For example, the inventive material can be made into gates for insertion into fireboxes to reduce noxious emissions as described above. The grates can be made by combining the inventive material with a ceramic material as described above, or with a non-ferrous metal to form an alloy. Such a firebox grate would eliminate the need for a stack or scrubbers.

While the invention has been described in detail and with reference to a specific embodiment thereof, it will be apparent to one skilled in the art that various changes and modifications can be made therein without departing from the spirit and scope thereof.

What is claimed is:

1. A method of generating heat comprising subjecting a mineral composition to sub-atmospheric pressure conditions in a controlled environment, said mineral component comprising plagioclase feldspar in an amount greater than 50 wt % based on the weight of the mineral component, said feldspar mainly comprising albite and anorthite minerals.

2. The method as claimed in claim 1, wherein said mineral composition further comprises a minor proportion of mica, kaolinite and serpentine in a total amount of less than 50 wt % based on the weight of the mineral component.

3. The method as claimed in claim 2, wherein said mineral composition is part of an alloy composition, said alloy comprising a metal selected from the group consisting of copper, iron, steel, stainless steel, brass, titanium, cast iron, nickel, aluminum and magnesium.

4. The method as claimed in claim 1, wherein said mineral component contains magnetite.

5. The method as claimed in claim 1, wherein magnetite has been removed from said mineral component.

6. The method as claimed in claim 1, wherein said sub-atmospheric pressure is obtained by using a vacuum suction pump.

* * * * *